(No Model.)
W. C. PITNER.
TWO WHEELED VEHICLE.
No. 307,329. Patented Oct. 28, 1884.
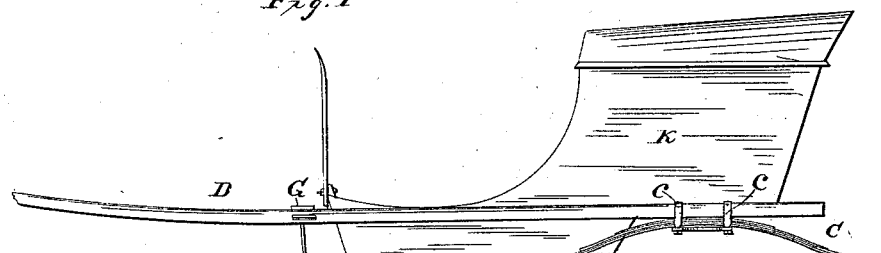
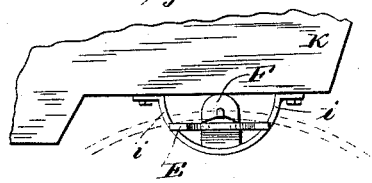
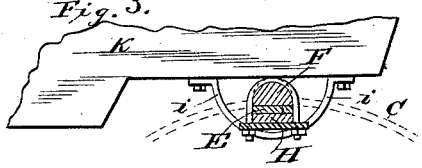
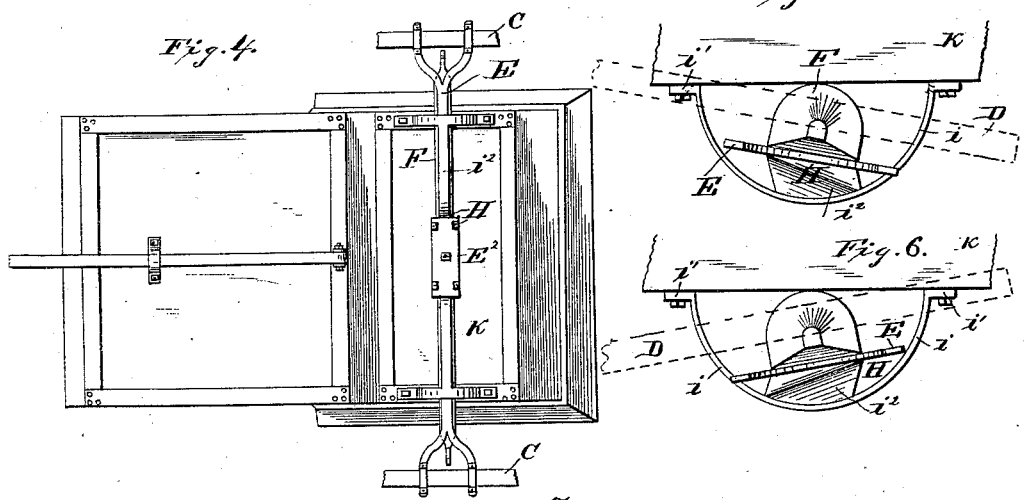
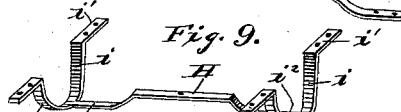
WITNESSES
Chas. R. Burr
J. S. Barker
INVENTOR
William C. Pitner
by Doubleday & Bliss
Attorneys.

UNITED STATES PATENT OFFICE.

WILLIAM C. PITNER, OF LA PORTE, INDIANA.

TWO-WHEELED VEHICLE.

SPECIFICATION forming part of Letters Patent No. 307,329, dated October 28, 1884.

Application filed August 4, 1884. (No model.)

*To all whom it may concern:*

Be it known that I, WILLIAM C. PITNER, a citizen of the United States, residing at La Porte, in the county of La Porte and State of Indiana, have invented certain new and useful Improvements in Two-Wheeled Vehicles, of which the following is a specification, reference being had therein to the accompanying drawings.

Figure 1 is a side view of a portion of a vehicle embodying my improvement. Fig. 2 is a side view of a part of a body, the shafts and the side spring being removed. Fig. 3 is a similar view, showing the parts which support the body in section. Fig. 4 is a bottom view of the body and its support. Figs. 5 and 6 are views illustrating the positions of the body and the draft devices when the latter are thrown out of the horizontal. Figs. 7, 8, and 9 show, respectively, parts of the body-support detached. Fig. 10 is a rear view of the body-support detached, the parts shown separately in Figs. 7, 8, and 9 being in this figure (10) secured together.

This invention relates to improvements in two-wheeled vehicles of such character as to obviate transmitting to the body the motions imparted by the horse to the draft devices, the object being, first, to support the body firmly, but at the same time so that it can rock about the line of balance; and, secondly, to have the motions of the draft devices received by a torsion-spring which is independent of the body-support.

Heretofore, when torsion-springs have been used near the balancing-line of the bodies of two-wheeled vehicles, they (said springs) have extended from one of the side elliptic springs to the other, and have been fastened directly to these side springs or to the shafts, and the bodies have been placed upon these torsion-springs, so that the latter acted as a vertical support for the former. To such constructions there are incident serious objections, which I obviate by a construction of the character herein shown and described below.

In the drawings, B represents the axle, which is supported in the wheels in the usual manner. At C there is shown one of the side elliptic springs, which are clipped to the axle below, and which have the shafts secured to their upper sides, as shown in Fig. 1. The shafts are joined by a cross-bar, G, and preferably extend somewhat back of the points of attachment to the side springs, C. However, these devices above described do not enter essentially into the present invention, and may be modified without departing from the spirit of the invention.

The body K of the vehicle is mounted between the shafts and between the side springs, C, it being supported in such manner as to balance, or nearly so, when the rider is in the seat. It is arranged and mounted in the following manner:

E represents a cross-bar extending from one side spring, C, to the other, it consisting, preferably, of a flat bar of iron secured at each end to one of the side springs by means of the clips c, which are used to fasten the shafts to said springs. I prefer to fork the cross-bar at its ends, (see Figs. 4 and 8,) in order that I may readily fasten them firmly to the springs, the forked ends being provided with apertures to receive the ends of the clip-bolts. Upon the top of the cross-bar there is placed a bar, F, preferably of wood, from one to two inches in cross-section, and having its upper edge rounded, as shown in Figs. 2, 3, 5, and 6. It extends from side to side of the body proper, and for purposes of ornamentation may be carried somewhat beyond the sides of the latter and shaped in any desired tasty manner. The body rests directly upon this bar, and the latter is so arranged that it can rock beneath the body, as will be described.

H represents a spring of suitable material and shape, it also extending from one side of the body proper to the other, and being placed on the under side of the bar E. At E' there are one or more clips so arranged as to fasten together the bar E, the spring H, and the bar F. If necessary, these parts can be still more rigidly fastened together by means of bolts, as at $E^2$.

I have shown the spring H as being curved or bent downward at points a short distance out from the center. This spring is connected to the body by means of legs $i\,i$ at the ends of the spring, those at each end forming a loop or U-shaped bar united with the downwardly-bent part $i^2$ of the spring. The part $i\,i$ may be formed integrally with the spring or separately therefrom and secured thereto by bolts, rivets, welding, or in any other suitable way. At the upper ends the arms *i i* have feet *i' i'*, with flat bearings, by which they can be readily fastened to the under side of the body. The spring H can be twisted at the ends, as will be readily understood.

By examining Fig. 5 of the drawings it will be seen that when the front ends of the shafts swing up the draft devices carry with them the bar F, which rocks beneath the body resting upon it, and as both the body and the draft devices are connected rigidly with the spring H, the latter yields at the center, and therefore the body is prevented from being thrown up, although the permanent connection between the parts is not broken. The reverse of this happens when the front ends of the shafts go down, as will be seen by examining Fig. 6—that is to say, the bar F is rocked forward, and the central part of the torsion-spring yields in the opposite direction, the result, so far as the body is concerned, being substantially similar to that above described.

In Figs. 5 and 6 the line of the shafts is shown by dotted lines, although it will be understood that the variations in the positions of the parts are exaggerated in order to clearly illustrate the movements involved. By means of devices of this character the body is held in proper horizontal position, regardless of the oscillations or vibrations imparted to the shafts by the horses.

I have spoken of the fact that my vehicle differs from those of this class heretofore used, in that the body is supported vertically independently of the torsion-spring. When the torsion-spring is depended upon to give vertical support, there is necessarily a vertical flexion of the spring, which seriously interferes with its proper torsional movements, and this I entirely avoid, leaving the spring to perform its peculiar function without interference. Moreover, when the spring is used to provide vertical support, and extends from one side spring to the other, it must be made thicker and stronger than is necessary for its proper office; but in a construction of the character of mine it may be very light and flexible, so that it shall bring to bear its torsional resistance instantly.

By those acquainted with the art it will be seen that many modifications can be devised, all embodying the essential feature of the construction shown—that is to say, having a balanced body, a body-support adapted to rock beneath the body as about an axis, and a torsion-spring independent of the body-support and arranged to prevent the transmission of motion from the draft devices to the body.

The body-support upon which the body rests, and which can rock relatively to the body as about an axis, is shown as consisting of the bars E and F, the side springs, the axle, the wheels, (not shown,) and the shafts also constituting part of said support; but, as these parts may be variously modified without departing from the invention, these are designated together as the "body-support."

J represents a spring situated centrally under the body, and connecting it with a cross-bar, G.

K' is a safety or tension strap attached to the under side of the body and encircling the spring J. However, I do not herein claim the features relating to this spring and the devices which support the front edge of the body, they being fully described and claimed in another application of mine, Serial No. 127,810, filed April 14, 1884. This spring may be omitted if the rear support is properly constructed; nor do I herein claim any one of the following combinations, viz: first, the combination of the axle, the body, a cross-spring upon which the body is mounted and which resists the tipping of the body relatively to the axle by its torsion, and supports for the cross-spring, which hold it away from the axle; nor, second, the combination of the axle, the side springs attached to the axle, the body, and a torsional cross-spring connecting the body with the side springs; nor, third, the combination of the axle, the side springs, the body, a cross-spring between the body and the side springs, and a plate attached to the side springs and provided with a loop or socket into which the end of the cross-spring fits; nor, fourth, the combination of the axle, the side springs mounted on the axle, the body, a cross torsional spring secured at its central part to the under side of the body and at its ends to the side springs, and the leaf-spring connecting the body with the shafts. I have made these, also, the subjects-matter of the aforesaid application; but the construction in the present case is materially different from that shown and described in my aforesaid application.

What I claim is—

1. In a two-wheeled vehicle, the combination of a body which or a part of which is balanced about a transverse line, a torsion-spring which bears against the body, substantially as set forth, to prevent the latter from rocking about the line of balance, and a body-support which holds the body vertically independently of the said torsion-spring, substantially as set forth.

2. In a two-wheeled vehicle, the combination of the body, the body-support arranged, substantially as set forth, to rock relatively to the body as about an axis, the body being balanced or nearly balanced about a line beneath the seat, and a torsion-spring connected with the body independently of the body-support, substantially as described.

3. In a two-wheeled vehicle, the combination of the body, the body-support arranged, substantially as set forth, to rock relatively to the body as about an axis, the body being balanced or nearly balanced upon a line beneath the seat, and a torsion-spring connected with the body independently of the body-support and fastened rigidly to the said support at points between the sides of the body, substantially as described.

4. In a two-wheeled vehicle, the combination of the body, the body-support upon which the body rests and is balanced or nearly balanced on a line beneath the seat, and a torsion-spring having lateral extensions which are secured to the body independently of the supporting means, substantially as and for the purpose set forth.

5. In a two-wheeled vehicle, the combination of the body, the body-support upon which the body rests and is balanced or nearly balanced on a line beneath the seat, and a torsion-spring having a portion situated below that part of the body-support upon which the body rests, and having lateral extensions which are secured to the body independently of the supporting means, substantially as and for the purpose set forth.

6. In a two-wheeled vehicle, the combination of the body, the body-support having a bar, F, upon which the body rests, and a torsion-spring secured in place below said bar, and having lateral projections extending up to and secured to the body, substantially as set forth.

7. In a two-wheeled vehicle, a body and body-support having springs, as at C, to resist the vertical motions of the body, said body-support being arranged to rock relatively to the body as about an axis, in combination with a second spring or springs independent of and disconnected from the aforesaid springs, and bearing against both the body and the body-support, and arranged, substantially as set forth, to resist the axial motion of the body-support relatively to the body, and vice versa, as described.

8. In a two-wheeled vehicle, the combination of the body, the springs at the side of the body, cross-bar E, rigidly secured to said springs, the bar F, upon which the body rests, and the torsion-spring H, secured to the bars E and F, and having the projections or arms $i$ $i$ secured to the body independently of the side springs, substantially as set forth.

9. In a two-wheeled vehicle, the combination of the body, the springs at the sides of the body, the cross-bar E, secured to said springs, the bar F, the shafts joined directly to said bars and to the said springs, and a torsion-spring independent of the side springs and disconnected therefrom, substantially as set forth.

In testimony whereof I affix my signature in presence of two witnesses.

WILLIAM C. PITNER.

Witnesses:
　FRED. M. PITNER,
　A. K. FOSDICK.